United States Patent [19]
Tsumura et al.

[11] Patent Number: 5,353,337
[45] Date of Patent: Oct. 4, 1994

[54] DEVICE FOR THE TRANSMISSION OF DATA BY TELEPHONE LINE

[75] Inventors: Mihoji Tsumura; Shinnosuke Taniguchi, both of Osaka, Japan

[73] Assignee: Ricos Co., Ltd., Osaka, Japan

[21] Appl. No.: 875,126

[22] Filed: Apr. 28, 1992

[51] Int. Cl.$^5$ .......................................... H04M 11/00
[52] U.S. Cl. ............................... 379/93; 379/96; 379/100
[58] Field of Search ............... 379/93, 96, 97, 98, 379/100, 53, 54, 101; 358/85, 86, 84, 142, 143, 144, 145, 146, 147

[56] References Cited

U.S. PATENT DOCUMENTS

| | | | |
|---|---|---|---|
| 4,251,691 | 2/1981 | Kakihara et al. | 358/85 |
| 4,538,176 | 8/1985 | Nakajim et al. | 358/86 |
| 4,943,963 | 7/1990 | Waechter et al. | 358/84 |
| 5,130,792 | 7/1992 | Tindell et al. | 358/85 |
| 5,132,992 | 7/1992 | Yurt et al. | 358/86 |
| 5,153,917 | 10/1992 | Kato | 380/3 |

FOREIGN PATENT DOCUMENTS

| | | |
|---|---|---|
| 0199268 | 10/1986 | European Pat. Off. . |
| 4151957 | 5/1992 | Japan . |
| 4207251 | 7/1992 | Japan . |

OTHER PUBLICATIONS

Frequenz, vol. 36, No. 435 (E-1263) Sep. 10, 1992 & JP A-41-51-957 (Rikosu) May 25, 1992 Abstract.
Review of the Electrical Communication Laboratories, vol. 33, No. 2, Mar. 1985, pp. 277-283, Y. Kobayashi et al. Videotex Terminals.
European Search Report, EP 92 11 2268.

*Primary Examiner*—Curtis Kuntz
*Assistant Examiner*—Jason Chau
*Attorney, Agent, or Firm*—Thompson, Hine and Flory

[57] ABSTRACT

A system for the transmission and reception of data by telephone line, the system making use of the idle time on the telephone line, which connects the switching system of a telephone exchange with the telephone in a user's home, to transmit signals by way of the telephone line from a center independent of the telephone exchange to the user's home. The center includes a data base for storing a plurality of items of compound data, each item consisting of a specified number of interrelated data groups, and a transmission unit which accesses the database, reads data groups in order from an item of compound data, converts the resultant digital signals to analog form and outputs the analog signals to the telephone line. The user's home includes a receiver, which converts analog signals received from the telephone line to digital form, and when the specified number of data groups have all been input, outputs each of the data groups simultaneously, and a specified number of terminals which operate in accordance with the data groups received from the receiver.

3 Claims, 1 Drawing Sheet

DEVICE FOR THE TRANSMISSION OF DATA BY TELEPHONE LINE

BACKGROUND OF THE INVENTION

1. Field of the Invention

The invention relates to a device for the transmission of data using the idle time on a telephone line connecting the switching system of a telephone exchange and the telephone in a user's home.

2. Description of the Prior Art

Telephone communication normally involves the connection of the switching system of a telephone exchange and a user's telephone through the medium of a telephone line. When the telephone receiver is lifted off the hook, a loop is formed through the telephone line between the telephone and the exchange's switching system making voice communication possible by the transmission of signals around said loop. There are known data transmission devices which make use of telephone line idle time For the unidirectional transmission of broadcast data in the Form of, for example, music to a user's home. A data transmission device of this type calls for the installation in a telephone exchange of an exchange device which can be used to switch the telephone line selectively between the switching system of the exchange itself and a center unit which is installed in an independent center and which is used for the transmission of analog signals in the form of speech or music. Each user's home is fitted with a home unit with a speaker, which is connected to the telephone line and which, when the receiver is lifted off the hook, connects the exchange device to the exchange's switching system to enable voice communication and, when the receiver is placed on the hook, switches the exchange device to said center unit which transmits broadcast signals down the telephone line to each home unit. In practice, a plurality of center units are normally connected to a single exchange device which can be turned on and off or switched selectively between said center units (in order to change channels) by the remote operation of each home unit. In addition to the speech and music signals referred to above, a center unit can also be used to broadcast data such as character or image data. In this sort of case, an image device would be used as the home unit.

However, although a conventional data transmission device normally permits the selection of any one of a plurality of possible broadcast signals, once this choice has been made, transmission is limited to the selected signal only. In other words, if, for example, two different categories of broadcast signals such as music and image signals were to be transmitted at the same time to a user's home, it would be impossible to coordinate the output of these signals at the user's end and this in turn makes it difficult to meet the modern demand for increased data transmission.

SUMMARY OF THE INVENTION

It is the object of this invention to augment the data transfer function of a single telephone line by devising a procedure for the transmission of different categories of signals from a center to a user's home. In order to achieve the above object, the present invention assumes the prior existence of a data transmission device which is designed to transmit signals from an independent center through a telephone line to a user's home by making use of the idle time on said telephone line, which connects the switching system of the local telephone exchange with the telephone in said user's home. Said center is equipped with a database, which holds a plurality of items of compound data each made up of a specified number of related data groups, and with a transmission means, which accesses the database, reads the data groups in order from a single item of compound data, converts the signals to analog form and outputs them to the aforementioned telephone line. At the same time, said user's home is equipped with a receiving means, which converts signals received from the telephone line to digital form and, when input of the specified number of data groups has been completed, outputs all the data groups simultaneously, and with a specified number of terminals, which operate in accordance with the groups of data output by said receiving means.

In the above configuration, a transmission means located in a center accesses a database and selects a single item of compound data from which it then reads groups of data in order, converts said data to analog signals and outputs them to a telephone line. At the same time, a receiving means located in a user's home converts the signals received from said telephone line to digital form and, when the specified number off data groups have been input, outputs all said data groups simultaneously to terminals, which then operate in accordance with the groups of data received. This enables data groups relating to different categories of data such as music data and image data, for example, to be transmitted together from said center and similarly output together in said user's home, thereby significantly augmenting the data transmission function of a single telephone line.

DETAILED DESCRIPTION OF THE PREFERRED EMBODIMENT

Figure 1:
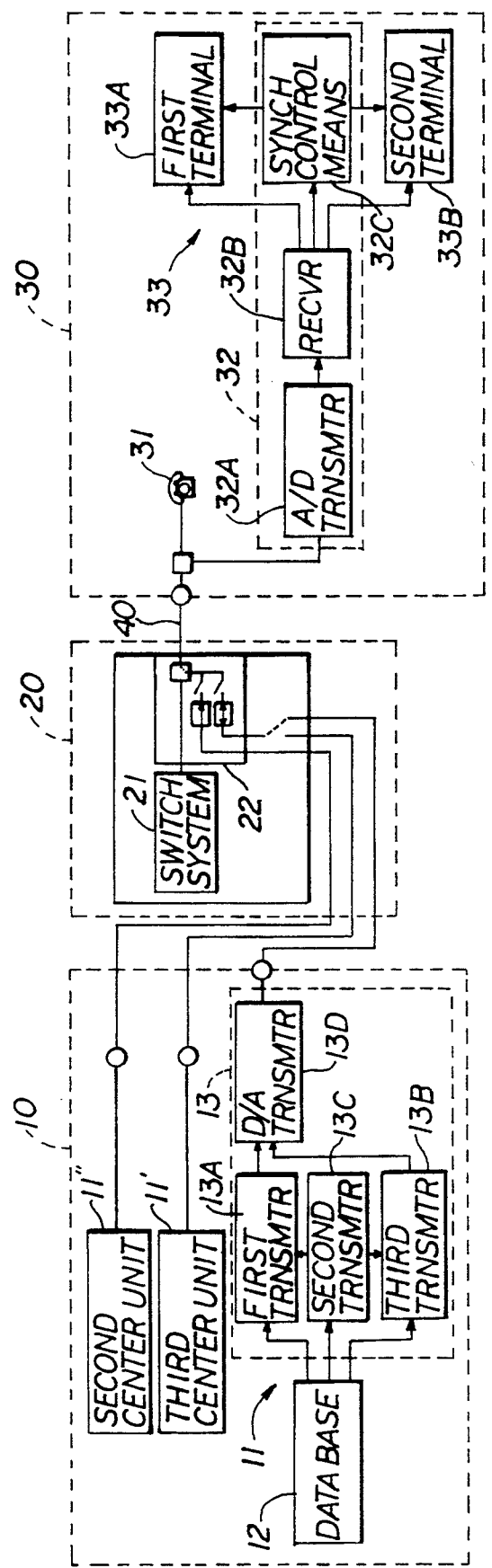
FIG. 1 is a block diagram showing the preferred embodiment of the present invention.

There follows a description of the preferred embodiment of the invention. FIG. 1 shows the data transmission device of the preferred embodiment. In said Figure, 20 is a telephone exchange and 30 a user's home, said telephone exchange 20 being equipped with a switching system 21 and said user's home 30 being equipped with a telephone 31. Said switching system 21 is connected to said telephone 31 through the medium of an analog telephone line 40. When the telephone 31 receiver is lifted off the hook, a loop is formed between said switching system 21 and said telephone 31 by way of said telephone line 40 and speech communication is made possible by the transmission of signals around said loop.

10 is a center independent of the aforementioned telephone exchange, said center being equipped with a first center unit 11, a second center unit 11' and a third center unit 11" which are used for the transmission of broadcast signals including speech and music signals. We will now describe the configuration of the first center unit 11.

(1) Database 12

The database 12 stores a plurality of items of compound data, each item being made up of two related data groups, X and Y. Although we have specified only two data groups in the preferred embodiment, it would be equally acceptable to incorporate three or more related data groups into each item of compound data. The important point is simply to ensure that the system is set in such a way as to support the requisite number of data categories to be transmitted from the center 10. The database 12 is also used to store mode control data.

(2) Transmission Means 13

The transmission means 13 accesses the aforementioned database 12 and, in cases where synchronous mode has been specified, reads data groups X and Y in order from a single compound data item, converts said data to analog broadcast signals and outputs them to the aforementioned telephone line 40. In cases where asynchronous mode has been specified, said transmission means 13 reads either data group X or data group Y as appropriate, converts said data to analog broadcast signals and outputs it to said telephone line 40. The transmission means 13 comprises the following elements.

1/ The First Transmitter 13a

The first transmitter 13a accesses the database 12 from which it reads and outputs data group X.

2/ The Second Transmitter 13b

The second transmitter 13b accesses the database 12 from which it reads and outputs data group Y.

3/ Transmission Control Means 13c

The transmission control means 13c accesses the database 12 from which it reads mode control data. It then switches between output from the first transmitter 13a and output from the second transmitter 13b in accordance with the content of said mode control data.

The transmission control means 13c also computes the timing of the transmission of data groups X and Y and issues instructions to the first and second transmitters 13a, 13b to read and transmit said data groups X and Y. The two operation modes governed by said mode control data are the synchronous mode and the asynchronous mode. In synchronous mode, data groups X and Y are transmitted in succession whereas in asynchronous mode said data groups X and Y are transmitted not in combination but independently of each other.

4/ D/A Converter 13d

The D/A converter 13d converts digital signals received from the first transmitter 13a and the second transmitter 13b to analog signals and then outputs them in the form of broadcast signals to the aforementioned telephone line 40. At the same time, the telephone exchange 20 is equipped with an exchange device 22 which is able to switch and connect said telephone line 40 selectively either to the exchange switching system 21 or else to one or other of the three center units 11, 11', 11'' (in the case of the first center unit 11, by way of the D/A converter 13d).

The user's home 30 is equipped with each of the following elements.

(I) Receiving Means 32

The receiving means 32 converts analog broadcast signals received from the aforementioned telephone line 40 into digital form and, when both data groups X and Y have been duly input, it outputs both of said data groups simultaneously. The receiving means 32 comprises the following elements.

1/ A/D converter 32a

The A/D converter 32a converts analog transmission signals received from the telephone line 40 to digital signals.

2/ Receiver 32b

On receipt of data groups X and Y in the form of broadcast signals from said A/D converter 32a, when in synchronous mode, the receiver 32b first stores the first data group X temporarily in a buffer. It then stores the second data group Y in a second buffer. Next, taking the completion of the input of data group Y as its trigger, said receiver 32b then outputs data group X to a first terminal 33a and data group Y to a second terminal 33b. Said receiver 32b also reads mode control data from said broadcast signals and outputs it to the synchronization control means 32c.

When in asynchronous mode, on the other hand, said receiver 32b transmits the data groups X and Y either to terminal 33a or 33b, whichever is appropriate, when the input of each individual data group from the aforementioned A/D converter 32a is complete.

3/ Synchronization Control Means 32c

On receipt of mode control data output by the aforementioned receiver 32b, the synchronization control means 32c instructs either the first terminal 33a or the second terminal 33b to start operating in accordance with the content of said mode control data. More specifically, in synchronous mode, on receipt of a data input complete signal from the receiver 32b, the synchronization control means 32c issues an operation start signal to the second terminal 33b. Said receiver 32b also sends a pulse synchronized with the clock signals of the first terminal 33a to the second terminal 33b to act as a timing signal. When in asynchronous mode, however, the receiver 32b sends only a dummy timing signal to the second terminal 33b.

(II) The Terminals 33

The terminals 33 operate in accordance with each of the data groups X and Y received from the aforementioned receiver 32b, with the first terminal 33a operating in response to data group X and the second terminal 33b operating in response to data group Y.

In the sort of configuration outlined above, when the telephone receiver is lifted off the hook, the exchange device 22 is switched to the exchange switching system to enable voice communication and, when the telephone receiver is placed on hook, the exchange device 22 is switched, during periods when the telephone line 40 is idle, to one or other of the center units to enable the idle time to be used for the transmission of broadcast signals from one or other of said center units 11, 11', 11'' by way of said telephone line 40 to the two aforementioned terminals 33a, 33b. Remote operating instructions can also be sent from said terminals 33a, 33b to turn the exchange unit 22 on and off and to select the required center unit (in other words, to change channels).

If, under the above circumstances, the first center unit 11 is selected and if the system is in synchronous mode, then the transmitters 13a, 13b first read data group X data and then data group Y data in said order from a single item of compound data stored in the database 12. Said data is then converted to analog signal form by the D/A converter 13d and output in the form of broadcast signals to the telephone line 40. On receipt at the user's home, said analog broadcast signals are converted to digital form by the A/D converter 32a and, when both data groups X and Y have been duly received, they are then output simultaneously by the receiver 32b to the terminals 32a, 32b, which operate in response to signals of the appropriate data group.

In the preferred embodiment outlined above, it is thus possible for the center 10 to transmit the related data groups X and Y and for the relationship between the two said groups of data X,Y to be maintained and re-output as required on receipt at the user's home 30, thereby augmenting the data transmission function of the single telephone line 40.

It is also possible to make use of the multiple addressing capacity of the data transmission device to transmit signals to all terminals at the same time.

The sorts of related data which could be considered for incorporation into the related data groups X and Y include the following.

1/ Musical Instrument Digital Interface MIDI data

For example, music data for use in a karaoke system.

2/ Character/Image Data

For example, character and image data for use in a karaoke system.

3/ Line Use Charge Data

4/ List of Music Titles

More specifically, if, in the preferred embodiment described above, MIDI data for use in a karaoke system is allocated to data group X and character and image data for use in a karaoke system is allocated to data group Y, then a MIDI sound source will be allocated for use as the first terminal 33a and a character and image display device will be allocated for use as the second terminal 33b. If a pair of karaoke data groups in the shape of MIDI data and of character and image data are subsequently transmitted from the center 10 to a user's home 30 then, on receipt at said user's home, the reproduction of said MIDI data by the MIDI sound source and the display of said character and image data on the character and image data display device can be duly synchronized, thereby enhancing the karaoke function of the system.

There are two types of character and image display devices which could be used for this purpose as outlined below.

(A) A Dedicated Character Display Device

This type of device comprises a character display control means and a character display means. The control operations carried out by the character display control means are as follows.

1/ Storage of received character data and character display control data in appropriate buffers.

2/ Extraction of display control data from received data.

3/ Issue of commands in accordance with the extracted control data to instruct a downstream character display unit to display regular or dot matrix characters as appropriate.

4/ In asynchronous mode, the issue of a command to start display on completion of the data receive operation.

5/ In synchronous mode, the issue of a command to start display in response to a display start signal issued by a synchronization control means.

6/ Maintenance of synchronization, after the start of display, in accordance with timing signals received from a synchronization control means.

The character display means, on the other hand, is a screen display comprising a light emitting diode matrix and with the capacity to display not only characters but also a variety of other simple symbols.

(B) A Device for the Display of Both Characters and Images

This type of device comprises a display control means and a visual display means. The control operations carried out by the display control means are as follows.

1/ Storage of received character and image data and of display control data in appropriate buffers.

2/ Extraction of display control data from received data.

3/ Issue of commands in accordance with the extracted control data to instruct a downstream visual display unit to display regular or dot matrix characters as appropriate.

4/ In synchronous mode, the issue of a command to start display in response to a display start signal issued by a synchronization control means.

5/ Maintenance of synchronization, after the start of display, in accordance with timing signals received from a synchronization control means.

The visual display means, on the other hand, is a known visual display which accepts digital input. It is also acceptable to broadcast by means of the PCM method rather than MIDI data. This invention enables data groups relating to different categories of data such as music data and image data, for example, to be transmitted in combination from said center and similarly output in combination in said user's home, thereby significantly augmenting the data transmission function of a single telephone line.

What is claimed is:

1. A system for transmission and reception of data over a telephone line, said system making use of idle time on said telephone line, said telephone line connecting a switching system of a telephone exchange with a telephone in a user's home, to transmit signals by way of said telephone line from a center independent of said telephone exchange to said user's home, said system comprising:

said center having (a) a database for the storage of mode control data and a plurality of items of compound data, each of said items consisting of a specified number of interrelated data groups, and (b) transmission means including a plurality of transmitters which access said database, and read out and output said interrelated data groups in order from an item of said compound data; transmission control means for reading said mode control data from said data base and issuing transmission instructions to said transmitters to read and selectively output said data groups based upon the contents of said mode control data; and a D/A converter which converts digital signals received from each of said transmitters to analog form and outputs said analog signals as groups of broadcast data signals to said telephone line; and receiving means located in said user's home, said receiving means having (c) an A/D converter which converts said analog signals received from said telephone line to digital form;

(d) a receiver which receives and stores said groups of broadcast data signals output from said A/D converter and, with input of a final one of said data groups acting as a trigger, outputs each of said data groups to an appropriate terminal; and (e) a specified number of terminals which operate in accordance with said data groups received from said receiving means.

2. The system for transmission and reception of data over said telephone line according to claim 1, in which said transmission control means reads said mode control data from said database and selectively outputs said data groups from said transmitters in accordance with said mode control data such that, when in a synchronous mode, said data groups are transmitted in order and, when in a asynchronous mode, said data groups are left unlinked and are transmitted independently; and said receiver, when in said synchronous mode, stores each of said broadcast signal data groups separately and, with input of a final one of said data groups acting as a trigger, outputs all data groups to their appropriate terminals, while at the same time also reading and outputting said mode control data from said broadcast signals, and, when in said asynchronous mode, outputs each data group individually to its appropriate terminal as soon as its input is complete, said receiver including a synchronous control means which incorporates a function which enables it, when in said synchronous mode, to issue operating instructions based on said mode control data to said terminals on receipt of an appropriate notification from said receiver that data receipt has been completed, and to synchronize timing signals input to each terminal.

3. The system for the transmission and reception over said of data telephone line according to claim 1, in which a first data group consists of Musical Instrument Digital Interface (MIDI) data for Karaoke use and a second data group consists of character and image data for Karaoke use, and in which a first terminal is a MIDI sound source which accepts said MIDI data and a second terminal is a character and image display means which accepts said character and image data.

* * * * *